March 21, 1961  R. W. HAUTZENROEDER  2,975,633
DEVICE FOR DETECTING SLIP IN A TORQUE CONVERTER
Filed Nov. 12, 1957
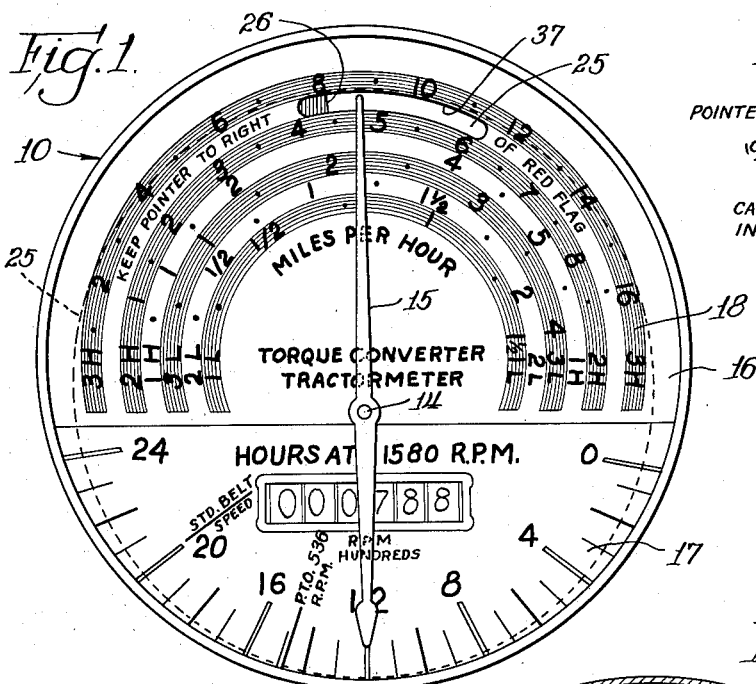
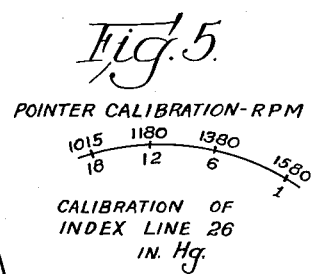
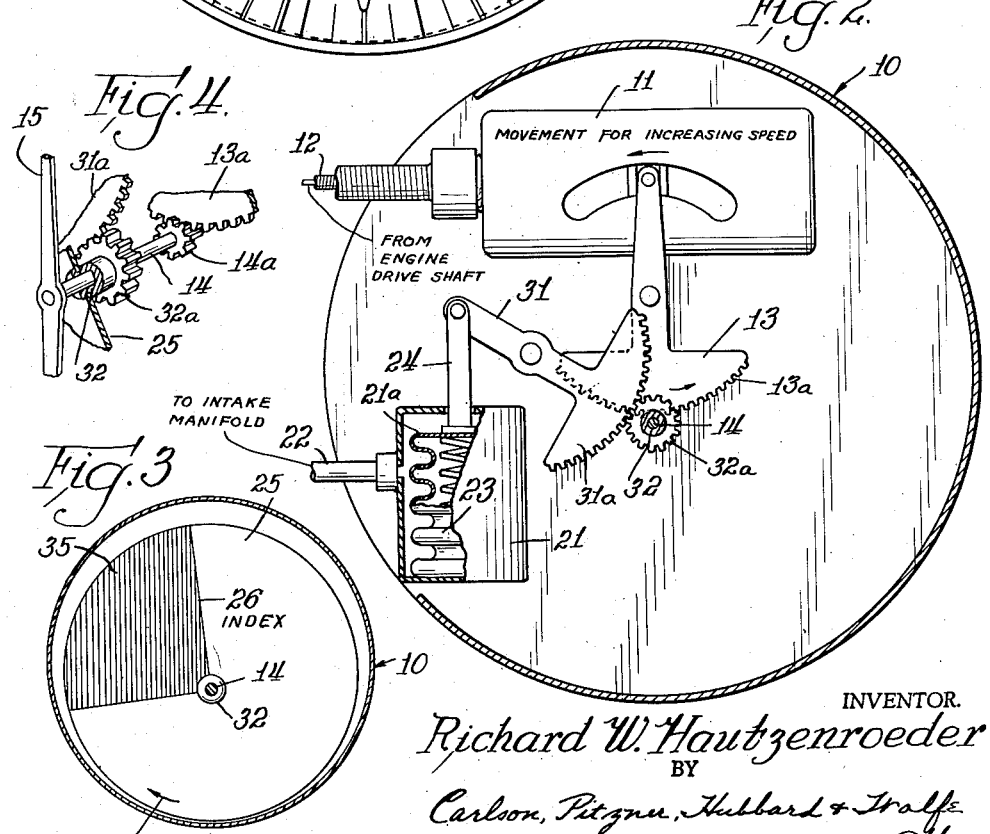
INVENTOR.
Richard W. Hautzenroeder
BY
Carlson, Pitzner, Hubbard & Wolfe
Attys.

United States Patent Office 2,975,633
Patented Mar. 21, 1961

2,975,633

DEVICE FOR DETECTING SLIP IN A TORQUE CONVERTER

Richard W. Hautzenroeder, Detroit, Mich., assignor to Massey-Ferguson Inc., a corporation of Maryland Filed Nov. 12, 1957, Ser. No. 695,757

4 Claims. (Cl. 73—116)

This invention relates to the operation of power plants in which internal combustion engines provide power through transmissions having fluid couplings such as torque converters. More particularly, the invention concerns the detection of efficiency loss or "slip" in an engine driven fluid coupling when under load.

It has become increasingly common to provide engine driven vehicles with transmissions having torque converters or similar fluid coupling. The advantages of such transmissions have now begun to dictate their use in agricultural tractors, and in this application a serious problem has been presented.

Tractor engines are commonly designed to operate at a fairly constant driving speed, or r.p.m., and multiple speed transmissions are employed to convert the engine speed to the speed required to do a particular job. Tractors operate under a wide range of loads depending upon the task being performed, but in almost all cases, the tractor's forward motion is not rapid.

When a fluid coupling, such as a torque converter, is utilized in the tractor transmission, the normal slow motion of the tractor and the rather constant engine speed makes it difficult for the operator to sense when the fluid coupling begins to "slip," and the tractor slowed, under a load too heavy for the particular gear setting and engine speed being employed. This slippage not only represents an appreciable power loss, but it is also dangerous since it tends to heat the fluid in the coupling beyond the capacity of the fluid cooling system.

It is, therefore, highly desirable to provide a tractor operator with some indication of when his fluid coupling transmission is slipping so that he can "down shift" to develop the power output at a higher engine r.p.m.

Since "slip" is simply the drop in rotary output speed of the fluid coupling with respect to the rotary input speed, it will be obvious that slip could be measured by a pair of tachometers sensing the input and output speeds, respectively, of the coupling. As a practical matter, however, this would be of little help to a tractor operator who cannot be expected to mentally juggle readings from two instruments and to perform proportional mathematics quickly "in his head." Furthermore, objectionable slip cannot be measured as a simple proportion of the transmission output and input speeds. It will be appreciated that at low engine speeds more slip can be tolerated without danger than at high speeds where a small proportional input-output difference can cause rapid heating of the fluid. Moreover, it has been discovered that the fluid cooling arrangement in a given power plant is more efficient within certain engine speed ranges than within others, and therefore within these ranges more heat can be absorbed and more slip can be permitted.

It is, therefore, the general aim of the invention to provide a novel apparatus for detecting slip in an engine driven fluid coupling, such as a torque converter, that is accurate, reliable and simple.

It is also an object of the invention to provide an apparatus with economical instrument components of standard types.

Moreover, it is an object to provide novel apparatus that is independent of engine and converter speeds, and is therefore effective through any desired range of operating conditions.

Collateral with the above objects, it is an object of the invention to provide a "slipmeter" instrument which is simple, reliable and easy to directly interpret or "read" at a glance. It is a related object to provide an instrument of this type which provides information that can be immediately grasped and understood by persons without special training or skill.

It is a further object to provide an instrument as characterized above which is compact and unobtrusive and may be conveniently incorporated in a tractor operator's control panel without introducing confusion or unduly complicating the operator's instruments.

It is yet another object to provide an instrument of the above type which may be added to a tractor or similar vehicle with a minimum amount of structural adaption and expense.

Other objects and advantages of the invention will become apparent upon reading the attached detailed description and upon reference to the drawings in which:

Figure 1 is a face view of an instrument embodying the present invention.

Fig. 2 is a front view, partially diagrammatic, showing the operating mechanism of the instrument of Fig. 1 and with the indicating members removed for visibility.

Fig. 3 is a face view of the manometer indicating member positioned behind the dial face shown in Fig. 1.

Fig. 4 is an expanded fragmentary view of the gearing used in the mechanism.

Fig. 5 shows a typical pointer and disc calibration over the visible operating range of the disc.

While the invention will be described in connection with a preferred procedure and embodiment, it will be understood that I do not intend to limit the invention to that procedure and embodiment. On the contrary, I intend to cover all alterations, modifications and equivalents as may be included within the spirit and scope of the invention as defined by the appended claims.

*The method*

It will be appreciated that for every engine input speed available for driving a torque converter transmission, there is a particular maximum torque or load which can be handled before the transmission begins to slip, lose efficiency, and build up heat in the converter fluid. Moreover, it will be understood that the torque output of an internal combustion engine can be rather accurately determined by measuring the intake manifold vacuum of the engine.

Therefore, in accordance with the present invention, objectionable slip in an engine driven fluid coupling is detected by comparing the engine driving speed with the engine manifold vacuum, objectionable slip being indicated by a lower manifold vacuum for the given engine speed than that empirically determined as satisfactory for a power plant of the particular type. To this end, empirical tests are made with a representative power plant of the type to be utilized. The engine is run at a series of incrementally varying driving speeds, and at each speed the transmission output is loaded until objectionable slip occurs in the fluid coupling. The point where slip can be characterized as objectionable depends upon many variables, especially the capability of the fluid cooling system at the particular engine speed. Also it is desirable for reasons of fuel economy to avoid excessive slip.

At each engine speed, when the loss of efficiency and heat build-up becomes objectionable, the intake manifold vacuum is noted. The amount of vacuum will, of course, drop as the load is increased. Thereafter, when operating power plants of this type, a drop in manifold vacuum below the limit empirically determined during the test, indicates that the converter is operating too inefficiently and that a heat build-up is taking place. The operator is thus warned to "down shift" so as to increase the engine speed and decrease the engine torque loading while performing the work desired.

As a practical matter, actual operating tests of a tractor power plant having a transmission which incorporates a fluid coupling in the form of a torque converter, indicates that objectionable slip in the converter tends to occur only within a certain limited range of engine speeds. At low engine speeds, only very light work normally is performed, and while the converter is operated in an inefficient converting range, i.e., even if there is substantial slippage, there is no appreciable heat build-up in the converter fluid. At high engine speeds, the converter "couples up" tightly so that there is little or no slip in the transmission even at high torque loads. Thus, only the intermediate engine speed range is critical.

As an illustrative example of the invention, tests were made with a tractor power plant having a gasoline engine rated at approximately 35 brake horse power coupled to a torque converter transmission. It was determined that a converter efficiency of less than seventy percent would be objectionable; that is, no more than thirty percent of the engine's driving power should be lost to slip and cause resulting heat build-up. It was found that below 1,000 engine r.p.m. the resulting slip and heat loss is not objectionable. Also, it was noted that at engine speeds of over 1,600 r.p.m. the converter "couples up" so that there is only minor slip even with the converter output heavily loaded.

Thus, empirical tests were made with the engine operating at incremental speeds in the critical speed range of 1,000 to 1,600 r.p.m. At each speed, the converter output was loaded until the converter was approximately seventy percent efficient and the engine intake manifold vacuum was recorded. This produced the following table:

| Engine Speed (r.p.m.) | Manifold vacuum (Inches of Hg) |
|---|---|
| 1580 | 1 |
| 1540 | 2 |
| 1500 | 3 |
| 1460 | 4 |
| 1420 | 5 |
| 1380 | 6 |
| 1350 | 7 |
| 1320 | 8 |
| 1280 | 9 |
| 1250 | 10 |
| 1215 | 11 |
| 1180 | 12 |
| 1150 | 13 |
| 1125 | 14 |
| 1100 | 15 |
| 1070 | 16 |
| 1040 | 17 |
| 1015 | 18 |

Thereafter, when operating a tractor having a power plant of this type, a manifold vacuum at a given engine speed below that indicated in the table tells the operator simply, accurately and reliably that the torque converter is operating inefficiently by reason of excessive slippage and that the power loss is likely to cause a dangerous heat build-up in the converter fluid.

*The apparatus*

Turning now to the drawings, a novel instrument or "tractormeter" 10 is shown for detecting objectionable slip in a fluid coupling by employing the method described above. In order to measure the driving speed of an engine, a standard tachometer mechanism 11 is used having a flexible shaft 12 coupled to the engine drive shaft and having an output element 11a which moves to the left upon increasing speed. Coupled to the tachometer is a gear segment member 13 in the form of a lever having a segment 13a and pivoted at a central pivot 13b. Meshed with the segment is a pinion 14a having a shaft 14 on which a speed indicator or pointer 15 is fixed. The pointer 15 is adapted to sweep over an instrument dial face 16 in a clockwise direction in response to increasing engine speed.

The dial face 16 of the instrument 10 is divided into a lower portion 17, calibrated in hundreds of revolutions per minute, and an upper portion 18, calibrated in miles per hour for each of the tractor's six forward gear speed settings and representing the ground speed of the tractor corresponding to the engine speed developed. For present purposes it is to be especially kept in mind that the position of the pointer 15 depends at all times upon the existing engine speed.

In order to determine the vacuum in the intake manifold of the engine, a manometer device 21 is coupled by means of a flexible tube 22 to the intake manifold of the engine with which the instrument 10 is utilized. The device 21 utilizes a sealed bellows 23 mounted in a chamber 21a. A rod 24 is secured to the upper end of the bellows and passes through an opening in the upper wall of the chamber, the rod being free to move in response to changes in the intake manifold vacuum. In the present instance, an increase in manifold vacuum causes the rod to move upwardly and a decrease in vacuum causes the rod 24 to move downwardly.

In accordance with one aspect of the invention, the manometer device is coupled to an indicating member movable in a plane adjacent the speed indicator and carries an index which cooperates with the indicator and so arranged that movement of the index is coordinated with the movement of the indicator, moving in response to decreasing manifold vacuum in the same direction that the indicator moves with increasing engine r.p.m. More specifically, the manometer is so calibrated that the index is alined with the indicator 15 when the torque load on the engine for a given engine speed causes the fluid coupling in the tractor transmission to operate at the minimum desired efficiency, so that objectionable slip in the coupling is indicated whenever the displacement of the index exceeds the displacement of the speed indicator.

In the present instance, the manometer rod 24 is coupled through a gear segment member 31 in the form of a lever having a segment 31a and centrally pivoted at 31b. Meshed with the segment 31a is a pinion 32a forming a part of sleeve 32. Mounted on the sleeve 32 is an indicator member 25 having an index 26. The sleeve 32 preferably surrounds and is coaxially disposed with respect to the tachometer shaft 14. In the preferred embodiment, the indicating member 25 is a flat disc carried by the sleeve 32 just beneath the dial face 16 of the instrument. The index 26 is formed by coloring a radial segment 35 of the member 25 in a contrasting color, which in the illustrated embodiment is red. The remaining portion of the indicating member is preferably the same color as the instrument dial face 16.

In order to be able to compare the positions of the index 26 and the indicator 15 over the desired central portion of the speed range, the instrument dial 16 is provided with an arcuate viewing slot 37 (see Fig. 1). Adapting the instrument 10 for use with the particular tractor power plant whose empirical test results were discussed above, the arcuate slot 37 extends through a pointer range corresponding to an engine r.p.m. of 1000 to 1600, this being the critical range wherein objectionable slip might occur.

The manometer device 21 is also calibrated so that the index 26 and the pointer 15 swing into alinement about their common axis for each engine speed and manifold vacuum set forth in the table presented above, typical calibration points being set forth in Fig. 5.

It will therefore be apparent that when the index 26 swings to the right of the indicator 15 when the latter overlies the slot 37, a condition of objectionable slip is being indicated by the instrument. The tractor operator thus is warned to shift to a lower speed range. The preferred instruction to the operator prominently set forth on the face of the instrument adjacent the opening 37 is as shown: "Keep pointer to right of red flag." The function of the instrument can be verbally explained to the operator by instructing him to keep the point "out of the red."

The instrument thus shows at a glance when the fluid coupling in the tractor power plant is slipping excessively so that an appropriate correction may be easily made. It will be appreciated that no particular skill is required to reliably interpret the instrument and because of the masking provided by the opening 37 the operator need only concern himself with the red flag when in the critical range.

I claim:

1. A slipmeter for directly indicating objectionable slip in the fluid coupling of a transmission driven by an internal combustion engine, comprising, in combination, a tachometer coupled to the engine for measuring the latter's driving speed, said tachometer having a dial and a pointer swingable in one direction over the dial in response to increasing engine r.p.m., a manometer coupled to the intake manifold of the engine for measuring the latter's manifold vacuum, said manometer having an indicating member swingable in a plane beneath said tachometer dial and in said direction in response to decreasing manifold vacuum, said member having an index line which may be alined with the pointer when the latter is in a selected speed range, said dial having an arcuate slot permitting said manometer member and its index line to be observed when alined with said tachometer pointer in said speed range, said manometer being calibrated for alining said index line with said pointer when the torque load on the engine for any particular speed in said selected range causes the coupling to operate at the minimum desired efficiency whereby objectionable slip in said coupling is indicated when said index line is swung farther in said one direction than is said pointer.

2. A slipmeter for directly indicating objectionable slip in the fluid coupling of a transmission driven by an internal combustion engine, comprising, in combination, a tachometer coupled to the engine for measuring the latter's driving speed, said tachometer having a dial and an indicator movable in one direction over the dial in response to increasing engine r.p.m., a manometer coupled to the intake manifold of the engine for measuring the latter's manifold vacuum, said manometer having an indicating member movable in a plane below said indicator and in said one direction in response to decreasing manifold vacuum, said member having an area of contrasting color defining an index line which may be alined with the indicator when the latter is in a selected speed range, said color area being on the side of said indicia line opposite said direction, said manometer being calibrated for alining said indicia line with said indicator when the torque load on the engine for any particular speed in said selected range causes the coupling to operate at the minimum desired efficiency whereby objectionable slip in said coupling is indicated when said indicator is disposed over said color area.

3. A slipmeter for use with a tractor or the like having an internal combustion engine driving a transmission which includes a fluid coupling, comprising, in combination, a housing defining a dial face, an indicator mounted for movement relative to said dial face, a tachometer coupled to the engine for measuring the latter's driving speed, said tachometer being connected to said indicator for causing said relative movement in one direction in response to increasing engine r.p.m., said dial face having an opening extending over the central portion of the engine speed range of said dial and indicator, an index mounted for movement relative to said dial face on the side of the face permitting the index to be viewed only through said opening, a manometer coupled to the intake manifold of the engine for measuring the manifold vacuum, said manometer being connected to said index for causing relative movement between said dial face and said index in said one direction in response to decreasing manifold vacuum, and said tachometer and manometer being calibrated so that they are in alinement with one another when the fluid coupling is operating at minimum desired efficiency and objectionable slip in said coupling is indicated when the index moves beyond said indicator.

4. A slipmeter for directly indicating objectionable slip in a fluid coupling of a transmission driven by an internal combustion engine comprising, in combination, a housing defining a dial face, a pointer mounted for movement relative to said dial face, a tachometer coupled to the engine for measuring the latter's driving speed, said tachometer being connected to said pointer for causing said relative movement in one direction in response to increasing engine r.p.m., means defining an index line mounted for movement relative to said dial face, said pointer, said index line and said dial face being mounted adjacent one another in closely spaced parallel planes, a manometer coupled to the intake manifold of the engine for measuring the manifold vacuum, said manometer being connected to said index for causing relative movement between said dial face and said index in said one direction in response to decreasing manifold vacuum, and said tachometer and manometer being calibrated so that said pointer and said index line are in alinement with one another when the fluid coupling is operating at minimum desired efficiency and objectionable slip in said coupling is indicated when the index moves beyond said indicator.

References Cited in the file of this patent

UNITED STATES PATENTS

| | | |
|---|---|---|
| 1,867,698 | Harris | July 19, 1932 |
| 2,389,281 | Staley | Nov. 20, 1945 |